United States Patent [19]

Lemcke, Jr.

[11] 4,129,046
[45] Dec. 12, 1978

[54] GEAR SHIFT CONTROL
[75] Inventor: Howard R. Lemcke, Jr., Aurora, Ill.
[73] Assignee: Caterpillar Tractor Co., Peoria, Ill.
[21] Appl. No.: 779,456
[22] Filed: Mar. 21, 1977
[51] Int. Cl.[2] .................... B60K 20/04; B60K 20/12
[52] U.S. Cl. .................................................. 74/473 P
[58] Field of Search ............... 74/473 R, 473 P, 477, 74/470

[56] References Cited
U.S. PATENT DOCUMENTS

| | | | |
|---|---|---|---|
| 2,197,938 | 4/1940 | Lapsley et al. | 74/473 R |
| 2,537,060 | 1/1951 | Keese | 74/700 |
| 2,690,684 | 10/1954 | Stemler | 74/477 |
| 3,429,202 | 2/1969 | Galicher | 74/473 R X |
| 3,513,716 | 5/1970 | Evans | 74/473 P |
| 3,677,105 | 7/1972 | Dence | 74/477 |
| 3,732,746 | 5/1973 | Fitzpatrick | 74/473 R |
| 3,934,485 | 1/1976 | Ratliff | 74/473 R |
| 3,939,724 | 2/1976 | Takahashi et al. | 74/477 X |

*Primary Examiner*—Horace M. Culver
*Attorney, Agent, or Firm*—Wegner, Stellman, McCord, Wiles & Wood

[57] ABSTRACT

An improved gear shift control for use in motor vehicle transmissions of the type wherein gear shifter forks are slidably mounted on associated elongated shifter rails within the housing of the transmission. The gear shift control includes a selector gate mounted within the transmission cover for rotation about a first axis transverse to the longitudinal axis of the shifter rails. A shift lever is mounted within the gate for rotation about a second axis, generally perpendicular to and intersecting the first axis, the lower end of the shift lever being selectively engageable with the shifter forks for movement of the shifter forks on their associated shifter rails. Tabs extend laterally from the lower end of the selector gate to selectively engage at least one shifter fork to prevent movement thereof during movement of another shifter fork. Opposed springs are provided to center the selector gate in a neutral position between changes in shifter fork positions.

4 Claims, 5 Drawing Figures

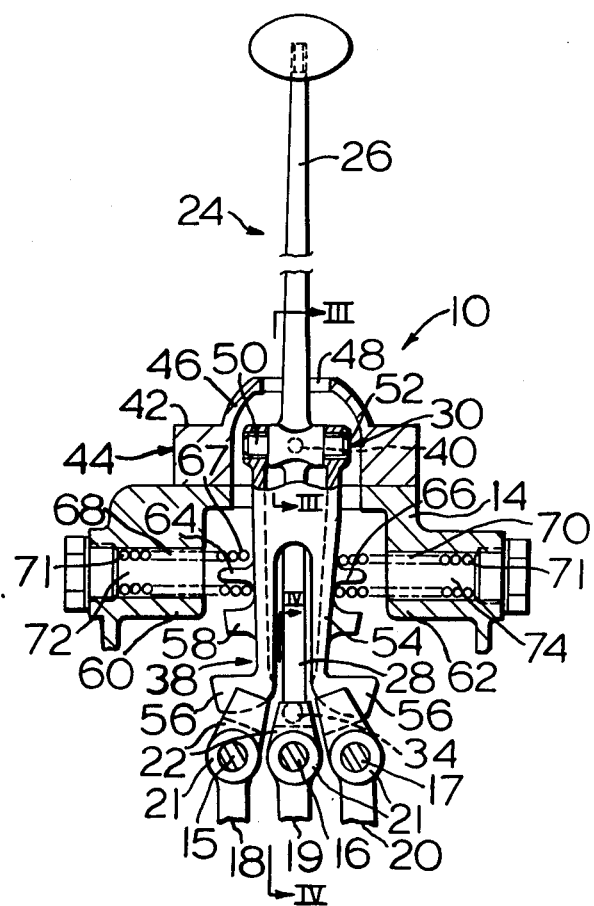

GEAR SHIFT CONTROL

BACKGROUND OF THE INVENTION

This invention relates to gear shift controls used in motor vehicle transmissions.

Typical motor vehicle transmissions include a plurality of longitudinally extending shifter rails upon which shifter forks are slidably mounted. Gears are individually associated with each fork and move therewith.

A shift lever extends downwardly from the cover of the transmission and terminates at a point slightly above the shifter rails so as to allow the lower end of the shift lever to selectively engage one of the shifter forks, as by capture of the lower end of the shift lever between the exposed sides of an offset arm extending upwardly from each of the shifter forks. Each of the shifter forks may be selectively positioned at a predetermined point along its associated shifter rail so as to place its associated gear in a desired relation to other gears. Movement of the shift lever is controlled by the operator of the vehicle.

When repositioning one of the shifter forks, it is desirable to prevent movement of the other forks, as only one gear should be engaged at one time. A gate is typically provided to prevent unwanted movement. Such a gate may typically comprise a flat plate mounted on gate rails for transverse movement in a plane above and parallel to the plane of the shifter rails. The gate rails extend in a direction perpendicular to that of the shifter rails. The shift lever extends through a slot in the gate and effects movement of the gate when moved in the direction perpendicular to the direction of the shifter rails. Movement of the lever in a direction parallel to the shifter rails does not cause movement of the gate.

The gate is provided with downwardly extending tabs to engage at least one shifter fork to prevent movement thereof when the shift lever engages another fork which is to be repositioned. The shift lever and gate may be returned to a neutral position when the gears are disengaged. Springs are typically provided to urge the shift lever and gate to a neutral position.

A problem associated with the above-described gear shifter is the incorporation of multiple components in the combination shift lever/selector gate, resulting in a higher cost and a less compact arrangement than is desirable. Additionally, movement of the shift lever in association with the slotted gate is a source of wear on the components.

SUMMARY OF THE INVENTION

The present invention is directed to overcoming one or more of the problems as set forth above.

According to the present invention, a compact gear shift control of unitary construction is provided wherein the axis of rotation of the shift lever intersects that of a rotatable selector gate. Further, the shift lever is contained within the selector gate and cooperates therewith to shift the shifter forks of a conventional vehicle transmission. The combination selector gate shift lever is centered within the transmission cover by opposed springs. Since the shift lever and its associated gate pivot about intersecting axes, a compact gear shifter which operates with a minimum amount of friction is provided.

DESCRIPTION OF THE DRAWINGS

FIG. 2 is a vertical sectional view taken at right angles to the view of FIG. 1;

FIG. 4 is a further enlarged side elevational view of a portion of the gear shift control taken approximately along line 4—4 of FIG. 2; and FIG. 5 is an elevational view of the gear shifter shown in FIG. 4 with the shift lever of the gear shifter in an alternate position.

DESCRIPTION OF THE PREFERRED EMBODIMENTS

Figure 1:
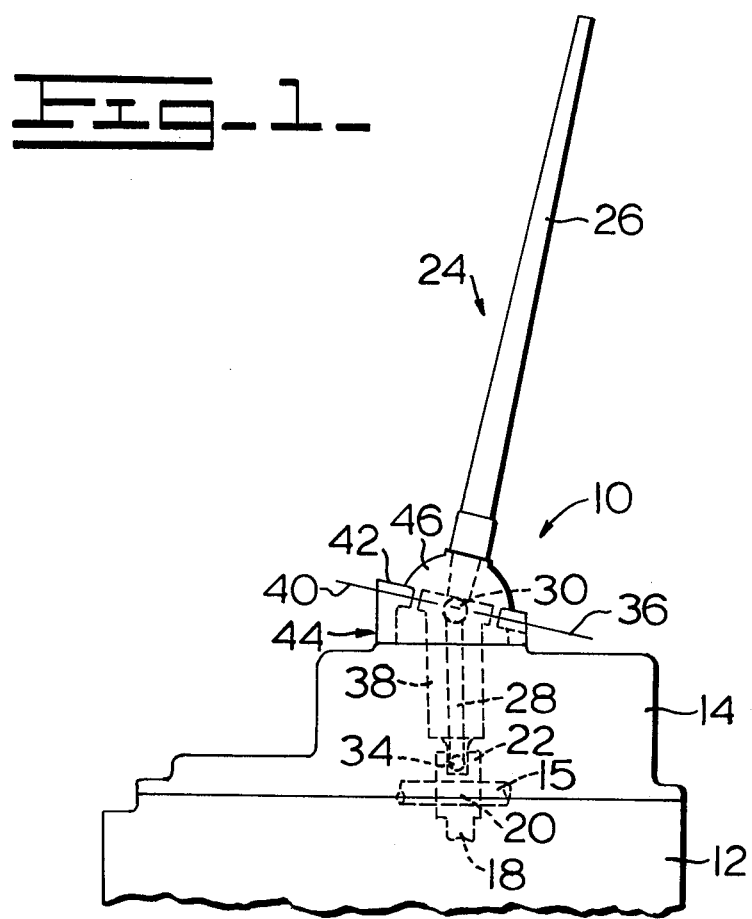
FIG. 1 is a side elevational view of a transmission housing and gear shift lever control embodying the features of the invention, with some parts shown in dotted lines.

Referring to FIG. 1, a gear shift control assembly 10 is provided to shift the gears of a conventional vehicle transmission (not shown) housed within a transmission housing 12 which includes a transmission cover 14. A plurality of conventional shifter rails extend longitudinally within the housing 12. For purposes of illustration, three shifter rails 15, 16 and 17 (FIG. 2) are provided. Three shifter forks 18, 19 and 20 are suspended, one from each of the rails 15, 16 and 17, and are slidably mounted thereon as by capture of each rail within a circular sleeve 21, the sleeves 21 being an integral part of each of the forks 18, 19 and 20. A forked portion 22 of each shifter fork extends upwardly of each sleeve 21. Selective positioning of each of the shifter forks 18, 19 and 20 on the rails 15, 16 and 17 serves to shift the gears of the transmission in a pre-determined, conventional manner.

Shifting of the shifter forks is effected by means of the gear shifter assembly 10, which is shown in FIG. 1 as including a shift lever 24 which includes an upper, manually positionable section 26 and a lower section 28 extending downwardly from a pivot axis 30 at the bottom of the section 26. The section 28 of the shift lever 24 includes a ball 34 at its lower extremity for selective engagement with the forked portions 22 of the shifter forks. As seen in FIG. 1, the pivot axis 30 of the shift lever 24 lies in a plane 36 which is at an angle to the horizontal. Such an angle allows the upper section 26 of the shift lever 24 to be easily accessible to the operator of the vehicle.

A selector gate 38 is suspended about a pivot axis 40 disposed in the plane 36 and intersecting at right angles the pivot axis 30.

As seen in FIG. 1, the plane 36 of axes 30 and 40 parallels the upper surface 42 of an upright support platform 44 situated on the transmission cover 14. An arcuate cover 46 is provided on the platform 44 and covers the pivot axes 30 and 40 of the shift lever 24 and the gate 38.

Referring now to FIG. 2, the components of the gear shift control 10 are shown in detail. The upper section 26 of the shift lever 24 enters the cover 46 through a generally conical opening 48 allowing the section 26 to travel forwardly and toward the sides of the opening 48. The pivot axis 30 is formed by two pins 50 extending from the sides of the shift lever 26 into two bores 52 in the gate 38.

The lower section 28 of the shift lever 24 extends downwardly from the pivot axis 30 between two tongues 54 of the gate 38. Each of the tongues 54 extends downwardly from the pivot axis 30 to approximately the level of the forked portions 22 of each of the gear shifter forks 18, 19 and 20. Extending laterally outwardly from the bottom of each tongue 54 are gate selector tabs 56, each tab 56 being selectively positionable within the forked portion 22 of any of the gear selector forks 18, 19 or 20. Two stops 58 extend oppositely and outwardly from each of the tongues 54 for abutment against corners 60 and 62 within the transmission cover 14. Two bosses 64 and 66 extend oppositely and outwardly from the tongues 54 from points above the stops 58, and retain the ends 67 of two springs 68 and 70. The opposite ends 71 of the springs 68 and 70 are retained within cavities 72 and 74 located in the transmission cover 14. The springs 68 and 70 are of approximately equal compressive strength, and therefore serve to center the gate 38 at approximately the position shown in FIG. 2 when no force is applied to the upper section 26 of the shift lever 24.

Figure 3:
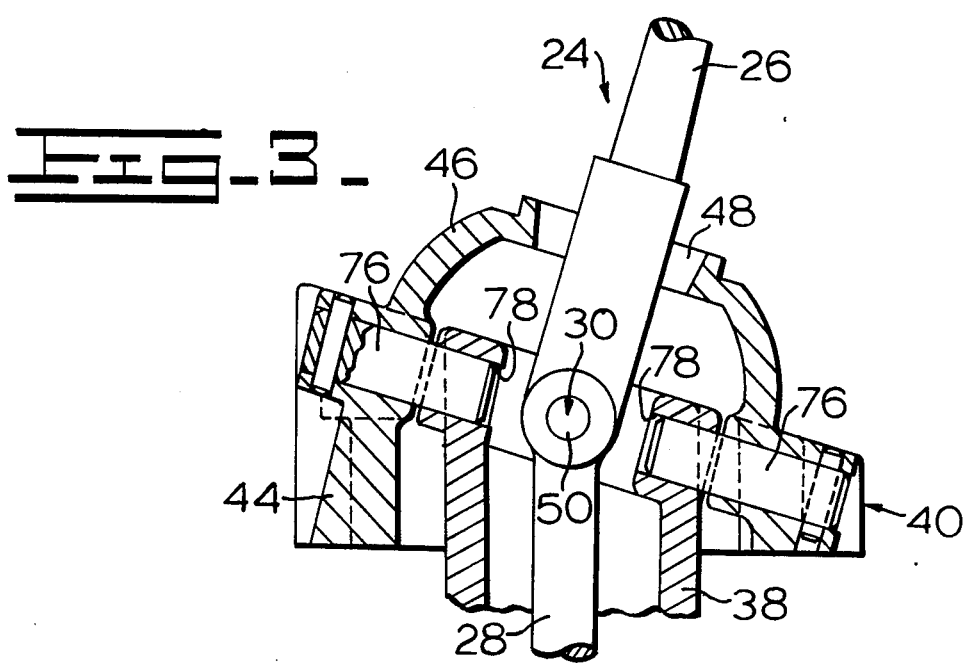
FIG. 3 is an enlarged side elevational view of a portion of the gear shift control, taken approximately along line 3—3 of FIG. 2.

Referring now to FIG. 3, the details of construction of the pivot axis 40 and the interior of the support platform 44 are shown. The pivot axis 40 is formed by two aligned pins 76 which extend from the gate 38 to bores 78 within the support platform 44. The shift lever 24 is free to rotate about the axis 30, while the gate 38 is prevented from rotating in the same direction by the pins 76. Since the pins 50 which form the axis 30 are contained within the gate 38, and the gate 38 is free to rotate laterally about the axis 40, the shift lever 24 may rotate toward the left or right, as viewed in FIG. 3, or in the direction perpendicular to the axis 40, or in any direction between those extremes. However, the gate 38 is free to rotate only about the axis 40.

Referring now to FIG. 4, the ball 34 of the shift lever portion 28 engages the forked portion 22 of the middle shifter fork 19 and the gate selector tab 56 of the gate 38 engages the forked portion 22 of the shifter fork 20 shown to the right in FIG. 2. The configuration shown in FIGS. 2 and 4 corresponds to a neutral gear position. Referring to FIG. 5, the configuration of shifter forks corresponding to a nonneutral gear position is illustrated. It may be seen that the middle shifter fork 19 has been repositioned upon the middle shifter rail 16, thereby shifting the gears of the transmission in the conventional manner. As noted above, the gate 38 is not free to rotate so as to change its longitudinal position. Therefore, even though the section 28 of the shift lever 24 may be rotated longitudinally relative to the shifter rails, the gate 38 and, therefore, the gate tab 56 remain stationary relative to the shifter rails. As a result, the shifter fork 20 appearing at the right of FIG. 2 is retained in a stationary position on the right hand shifter rail 17.

When it is desired to shift either shifter fork 18 or 20 the gate 38 and the shift lever 24 may be rotated about the axis 40 to place the ball 34 in engagement with the forked portion 22 of the desired shifter fork 18 or 20. The stops 58 prevent excessive rotation of the gate 38, and automatically position the shift lever ball 34 within a forked portion 22. When the shift lever ball 34 is positioned within the forked portion 22 of the shifter rail 18 or 20, one of the lateral gate tabs 56 is positioned within the forked portion 22 of the remaining shifter rails so as to prevent shifting thereof during the repositioning of either the left hand or righthand shifter fork 18 or 20.

It will be appreciated that the present invention provides a more compact gear shift control than possible previously by providing a shift lever and an associated gate which pivot about intersecting axes.

The embodiments of the invention in which an exclusive property or privilege is claimed are defined as follows:

1. A gear shift control for use in transmissions and the like comprising:
   a plurality of shifter rails;
   a plurality of gear shifter forks each slidably mounted on an associated shifter rail, each said shifter fork having a single slot of uniform width;
   a shift lever with a grippable end and an end selectively engageable with each of said slots, said slots and said lever end engageable therewith being of substantially identical dimension in the longitudinal direction of said shifter rails;
   means for mounting said shift lever for substantially universal pivotal movement about a plurality of intersecting pivot axes;
   a gear selector gate; and
   means mounting said gate on said shift lever including means connecting said gate to said lever for pivoting movement on a pivot axis intersecting the pivot axes of said shift lever.

2. The gear shift control of claim 1 wherein the pivot axis of said gate intersects one pivot axis of said shift lever at substantially right angles.

3. The gear shift control of claim 1 wherein said means for mounting said shift lever and said means for mounting said gate include common parts.

4. A gear shift control for use in a transmission or the like including a transmission housing, said housing including a pair of opposed cavities therein facing the interior of said transmission housing, said gear shift control comprising:
   a plurality of longitudinally extending shifter rails within said transmission housing;
   a plurality of gear shifter forks each slidably mounted on an associated shifter rail, each said fork having a single slot;
   a gear selector gate, said gate having two opposed bosses projecting therefrom and two opposed projections for abutment with said housing;
   a shift lever with a grippable actuating end and an operating end selectively engageable with each of said slots and extending through said selector gate;
   a pair of pins mounted on said housing and pivotally mounting said shifter gate for pivotal movement about a first axis;
   means on said selector gate defining a pivot axis intersecting and transverse to said first axis pivotally mounting said shift lever intermediate its ends for pivotal movement relative to said selector gate; and
   two opposed springs, each said spring engaging one said boss and being received in one said cavity in said housing to urge said gate and said shift lever to a generally upright position.

* * * * *